US008558758B2

(12) United States Patent
Sato et al.

(10) Patent No.: US 8,558,758 B2
(45) Date of Patent: Oct. 15, 2013

(54) INFORMATION DISPLAY APPARATUS

(75) Inventors: Yuji Sato, Owariasahi (JP); Ken Ishikawa, Nagoya (JP)

(73) Assignees: Equos Research Co., Ltd, Tokyo (JP); Aisin Aw Co., Ltd., Anjo (JP)

( * ) Notice: Subject to any disclaimer, the term of this patent is extended or adjusted under 35 U.S.C. 154(b) by 55 days.

(21) Appl. No.: 13/258,828

(22) PCT Filed: Mar. 26, 2010

(86) PCT No.: PCT/JP2010/055341
§ 371 (c)(1),
(2), (4) Date: Nov. 1, 2011

(87) PCT Pub. No.: WO2010/113788
PCT Pub. Date: Oct. 7, 2010

(65) Prior Publication Data
US 2012/0050138 A1 Mar. 1, 2012

(30) Foreign Application Priority Data

Mar. 30, 2009 (JP) .................................. 2009-082662
Mar. 25, 2010 (JP) .................................. 2010-070792

(51) Int. Cl.
*G09G 5/00* (2006.01)
(52) U.S. Cl.
USPC ....................................... 345/4; 345/7; 345/9
(58) Field of Classification Search
USPC ................ 345/7, 8, 9; 348/148, 115; 349/11; 359/13, 630
See application file for complete search history.

(56) References Cited

U.S. PATENT DOCUMENTS

| 7,952,808 B2 * | 5/2011 | Hotta et al. .................. 359/630 |
| 2009/0243963 A1 * | 10/2009 | Hotta et al. ...................... 345/7 |
| 2010/0253593 A1 * | 10/2010 | Seder et al. ...................... 345/7 |
| 2010/0268452 A1 * | 10/2010 | Kindo et al. .................. 701/201 |

FOREIGN PATENT DOCUMENTS

| JP | A-06-247184 | 9/1994 |
| JP | A-2006-142897 | 6/2006 |
| JP | A-2007-235532 | 9/2007 |
| JP | A-2008-094377 | 4/2008 |

OTHER PUBLICATIONS

International Search Report issued in International Patent Application No. PCT/JP2010/055341 dated May 11, 2010.

* cited by examiner

*Primary Examiner* — Kent Chang
*Assistant Examiner* — Nelson Rosario
(74) *Attorney, Agent, or Firm* — Oliff & Berridge, PLC

(57) ABSTRACT

An information display apparatus which improves the position accuracy of superimposed displays. In a navigation apparatus, a position relationship detection unit acquires, as position information, the relationship between the position of the vehicle and the actual position where an object to be displayed in a superimposing manner should exist in the landscape, a vehicle attitude detection ECU acquires the attitude information of the vehicle, and a facial orientation recognition ECU acquires the facial orientation information of the driver. A display position determining unit determines the display position of the object on an HMD and HUD based on the position information, attitude information, and facial orientation information, and a display image generation unit performs control so as to display the object at the display position at the HMD, etc.

4 Claims, 9 Drawing Sheets

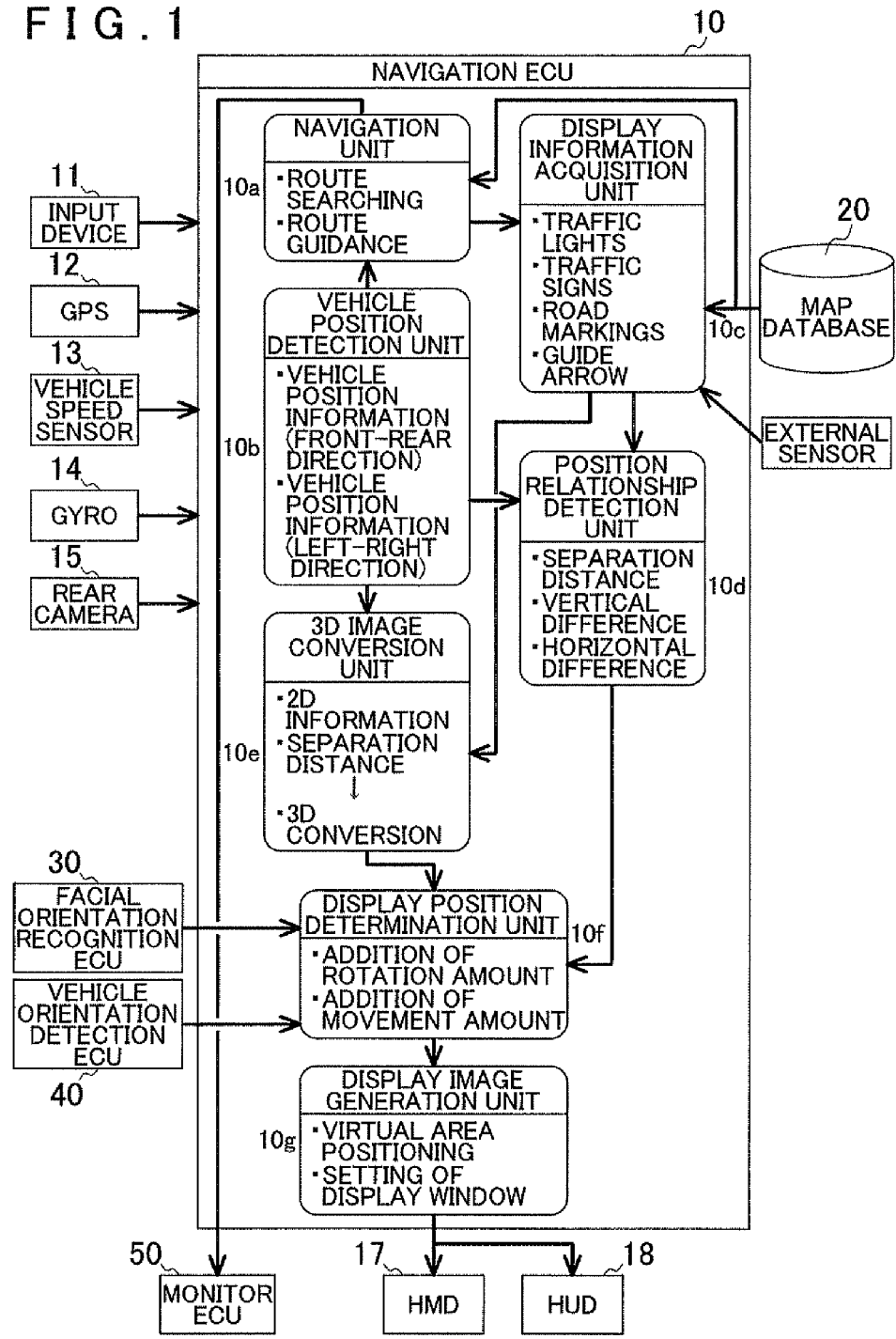

INFORMATION DISPLAY APPARATUS

TECHNICAL FIELD

The present invention relates to an information display apparatus that displays in a superimposed manner an informational image representing prescribed information on the landscape outside the vehicle as seen by the driver.

BACKGROUND ART

A conventional information display apparatus that displays in a superimposed manner an informational image representing prescribed information on the landscape outside the vehicle as seen by the driver is known, such as a display device on a vehicle as disclosed in Patent Document 1. According to such art, the face of the driver captured by two on-board cameras is recognized on an image and the position of the driver's eye point is detected. Display information is moved in position and/or adjusted in size in response to changes in the position of the eye point. Thus, position displacement of the information displayed in a superimposed manner is prevented even if the orientation of the driver changes.

Related Art Documents

Patent Document 1: Japanese Patent Application Publication No. JP-A-6-247184

DISCLOSURE OF THE INVENTION

Problem to be Solved by the Invention

However, the disclosed art does not consider the behavior or orientation of the vehicle. For example, if the vehicle is traveling on an uneven road surface or the like, the vehicle may move up and down or bounce, which may change the landscape outside the vehicle. In such case, the on-board camera also generally moves up and down along with the driver, thus making it difficult to prevent position displacement or the like of information displayed in a superimposed manner.

When the vehicle travels up or down a relatively steep slope (incline), the front part of the vehicle also moves up or down and cause significant changes to the forward landscape. Such changes can lead to fluctuations in the position relationship between the position of the display information and the superimposed display position in the landscape. Therefore, it is difficult to achieve a superimposed display that follows such changes in the landscape by simply moving the position and/or adjusting the size of the display information based only on changes in the position of the driver's eye point.

In other words, with the display device on a vehicle as disclosed in Patent Document 1, increasing the positioning accuracy of the superimposed display is difficult in consideration of the behavior and orientation of the vehicle and the fluctuations in the display position of the superimposed display on the landscape.

The present invention was devised to solve the problem described above, and it is an object of the present invention to provide an information display apparatus that solves the aforementioned problem and can improve the positioning accuracy of a superimposed display.

Means for Solving the Problem

In order to achieve the above object, technical means according to claim 1 of the claims is employed. According to such means, position information acquisition means acquires position information indicative of a relationship between a position of a vehicle and an actual position at which an informational image displayed in a superimposed manner should exist in a landscape, orientation information acquisition means acquires orientation information of the vehicle, and facial orientation information acquisition means acquires facial orientation information of a driver. Then, display position determination means determines a display position of the informational image to be displayed by display means based on the position information, the orientation information, and the facial orientation information. Display control means controls the display means to display the informational image at the display position determined by the display position determination means. Thus, the display position of the informational image displayed by the display means is determined based on the actual position at which the informational image should exist in the landscape, while taking into account the facial orientation of the driver and the orientation of the vehicle. Therefore, even when the landscape outside the vehicle as seen by the driver changes due to, for example, bouncing or up and down movement of the vehicle, a superimposed display that follows such changes in the landscape is possible.

Technical means according claim 2 of the claims is also employed. According to such technical means, the position information acquisition means acquires the position information based on one of information included in map information pertaining to roads, traffic signals, signs, buildings, rivers, and others forming the landscape; and route guidance information for the vehicle pertaining to a route guidance point, a destination point, and others. Thus, the position information can be acquired without using detection means such as an on-board camera, a millimeter-wave sensor, or an ultrasonic-wave sensor to detect such information. Specific examples of the map information include, for example, a map database that constitutes a type of navigation system installed in a vehicle (hereinafter referred to as an "on-vehicle type") and map data transmitted from an information center. The route guidance information may be guidance data regarding a shortest-distance route or a shortest-time route that is found by such a navigation system as a route by which the vehicle can travel the shortest distance or the shortest time to arrive at the destination from the departure point (or the current position of the vehicle), Examples of the route guidance information include an arrow indicating the traveling direction and a destination point mark.

Technical means according to claim 3 of the claims is also employed. According to such technical means, the display control means positions the informational image in a virtual area using informational image positioning means. The display control means can also output to the display means, using display object selection means, the informational image that exists within a display window covering a smaller area than the virtual area and settable at any position within the virtual area. Then, the display control means determines the position of the display window based on the display position determined by the display position determination means. Therefore, once the informational image is positioned in the virtual area, subsequent processing may simply change the position of the display window based on the display position determined by the display position determination unit.

Effects of the Invention

According to the invention of claim 1, the display position of the informational image displayed by the display means is determined based on the orientation of the vehicle or the actual position at which the informational image should exist in the landscape, while taking into account the facial orientation of the driver and the orientation of the vehicle. Therefore, even when the landscape outside the vehicle as seen by the driver changes due to, for example, bouncing or up and down movements of the vehicle, a superimposed display that follows such changes in the landscape is possible. Hence, the positioning accuracy of the superimposed display can be improved.

According to the invention of claim 2, the position information can be acquired without detecting the information included in map information pertaining to roads, traffic signals, signs, buildings, rivers, and others through the use of detection means such as an on-board camera, a millimeter-wave sensor, or an ultrasonic-wave sensor. Acquiring such information from the map database that constitutes the navigation system and the like can thus achieve a simpler apparatus structure.

According to the invention of claim 3, once the informational image is positioned in the virtual area, subsequent processing may simply change the position of the display window based on the display position determined by the display position determination unit. Therefore, an algorithm associated with the display control means can be made simpler compared to when no such virtual area is utilized and it is determined whether every informational image fits in the display window based on the display position determined by the display position determination means.

BRIEF DESCRIPTION OF THE DRAWINGS

FIG. 1 is an explanatory diagram that shows an example of the configuration of a navigation system (hereinafter referred to as the "present navigation system") according to an embodiment of the present invention.

BEST MODE FOR CARRYING OUT THE INVENTION

Figure 2A:
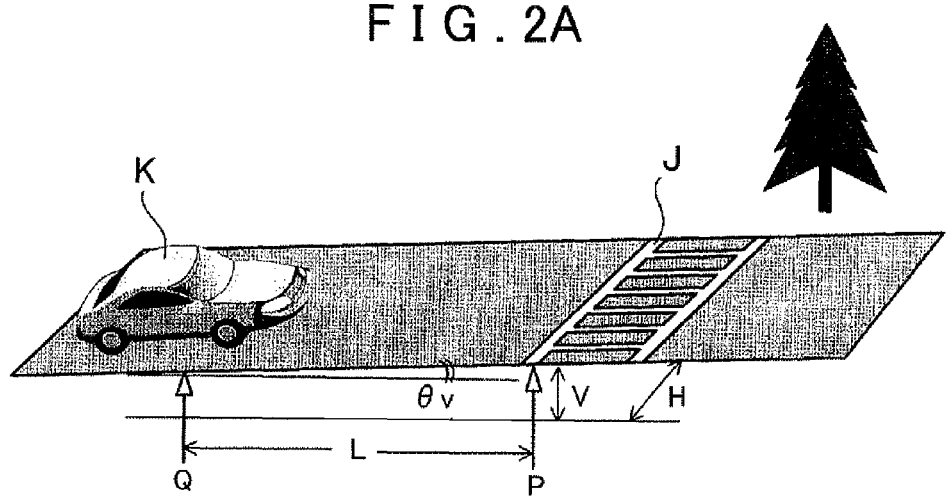
FIG. 2 shows explanatory diagrams of the concept of a superimposed display function and the like provided by the present navigation system.

Hereinafter, an embodiment in which the information display apparatus of the present invention is applied to a display of an on-vehicle type of navigation system and a display control thereof will be described with reference to the drawings. First, an example of the configuration of the present navigation system will be described with reference to FIG. 1.

As shown in FIG. 1, the present navigation system is mainly constituted by a navigation ECU 10, and also includes an input device 11, a GPS 12, various sensors such as a vehicle speed sensor 13, an HMD 17, a map database 20, a facial orientation recognition ECU 30, a vehicle orientation detection ECU 40, and a monitor ECU 50.

The navigation ECU 10 is an electronic control device constituted by a CPU, a semiconductor memory, an input/output interface, a LAN interface, and the like (hereinafter referred to as a "CPU and the like"), and has a function to control the overall navigation system. The basic function of the navigation ECU 10 is a function that provides guidance for a geographically shortest route, i.e., a navigation function. The navigation function is actualized by a navigation unit 10a and a vehicle position detection unit 10b. The navigation unit 10a and the vehicle position detection unit 10b function upon execution by the CPU of a predetermined program loaded to the semiconductor memory.

Namely, based on map data acquired from the map database 20, the navigation unit 10a finds the shortest-distance route from a current position (departure point) of the vehicle acquired by the vehicle position detection unit 10b to a destination entered through the input device 11. The navigation unit 10a then outputs the shortest route and accompanying guidance information to the monitor ECU 50. Hence, the driver of the vehicle can receive route guidance from the current position to the destination through a monitor image from the monitor ECU 50 or synthesized voice. Note that the departure point may also be entered through the input device 11.

In addition to the basic function of the navigation ECU 10 described above, the present navigation system includes, for example, a function to display a road surface marking on the road traveled by the vehicle, a guidance display provided by the navigation function, or the like (an informational image representing prescribed information) in a superimposed manner on the landscape outside the vehicle as seen by the driver (hereinafter referred to as a "superimposed display function"). Similar to the navigation unit 10a, this function is actuated upon execution by the CPU of various programs loaded to the semiconductor memory. Specifically, the various programs correspond to the vehicle position detection unit 10b, a display information acquisition unit 10c, a position relationship detection unit 10d, a 3D image conversion unit 10e, a display position determination unit 10f, and a display image generation unit 10g.

The GPS 12 has a function that detects the current position of the vehicle in latitude/longitude absolute coordinate values, and is a global positioning system that utilizes artificial satellites. The vehicle speed sensor 13 outputs in cycles a vehicle speed pulse in proportion to the speed of the vehicle (vehicle speed), and detects the vehicle speed of the host vehicle. A gyro 14 has a function that detects an angular velocity, which can detect the traveling direction of the host vehicle when the GPS 12 is not available. A geomagnetic sensor that detects geomagnetism to detect the travel heading may be used instead. Note that these transmit data to the navigation ECU 10 through, for example, an on-board LAN under a predetermined communication protocol such as CAN.

A rear camera 15 captures a rearward image of the vehicle, that is, the road traveled by the host vehicle. By outputting image information of lane marks (lane boundary lines) included in the captured image to the vehicle position detection unit 10b, a position of the travel lane (car lane) traveled by the host vehicle can be identified. The rear camera 15 also communicates data to the navigation ECU 10 through the on-board LAN. Note that the image recognition technique of the rear camera 15 for identifying the travel lane is a known technique, so the specific configuration thereof and the like will not be described here.

The HMD 17 is a head-mount display configured to be mountable on the head of the driver of the vehicle. In the present embodiment, the HMD 17 has a spectacle form and is a retina projection type that directly projects a formed image on the retina of an eye of the driver is used. A virtual-image projection type in spectacle form that projects a virtual image using a small half mirror or the like may also be used, provided that the HMD 17 is a head-mount display.

An HUD 18 is a head-up display configured on an upper part of the dashboard so as to be capable of projecting an image on the windshield of the vehicle. In the present embodiment, the HUD 18 is configured capable of displaying (displaying in a superimposed manner) an image over practically all of the driver's field of vision (vehicle forward view) so as to be superimposed on the landscape outside the vehicle.

Note that usually one of the HMD 17 and the HUD 18 is selected, and either is provided in the vehicle. Both the HMD 17 and the HUD 18 are configured using known technology, so the specific configuration thereof and the like will not be described here. These devices and the navigation ECU 10 are connected through, for example, a dedicated high-speed serial data bus that enables high-speed transmission of large volumes of image data.

The map database 20 is a relatively high-capacity magnetic or optical information storage medium formed from a CD, a DVD, or the like. The map database 20 accumulates the map data required for finding a route or performing route guidance by the navigation unit 10a. In the present embodiment, for example, the following information is accumulated in the map database 20: roads, traffic signals, signs (including road signs provided on pedestrian bridges, buildings, and the like), markings (road markings displayed on road surfaces), buildings, and rivers. In addition, the following is also included as road-related information: road types (expressways, major arterial roads, narrow city streets, and the like), road widths, number of lanes, slope angles, speed limits, traffic direction restrictions, traffic restriction periods, as well as traffic signal and sign heights, and height information for buildings, steel towers, and the like.

In the present embodiment, the map database 20 also accumulates the following information as road lane information: latitude/longitude absolute coordinate values of lines marked on road surfaces, line colors (white, yellow, and so forth), and line types (dotted lines, solid lines, double lines, and so forth). The map database 20 is connected to the navigation ECU 10 through, for example, a parallel data bus.

The facial orientation recognition ECU 30 is an electronic control device that includes a plurality of on-board cameras (not shown) that can capture the driver's upper body, particularly the driver's face (head). Similar to the navigation ECU 10, the facial orientation recognition ECU 30 includes a CPU and the like. Using a predetermined image processing program, the facial orientation recognition ECU 30 detects the orientation of the driver's face (facial orientation), based on the moving direction (angle) and velocity of the eye point. The eye point is the center between both eyes of the driver based on the captured image information. Note that the facial orientation recognition ECU 30 may correspond to "facial orientation information acquisition means" described in the claims.

In the present embodiment, for example, the following elements are used to detect facial orientation: three types of head rotation amounts (yaw, pitch, and roll), and three types of head movement amounts (amount of translation in the front-rear direction, the left-right direction, and the up-down direction with no rotation involved). In other words, facial orientation information of the driver is detected using six types of parameters (yaw rotation amount, roll rotation amount, pitch rotation amount, front-rear movement amount, left-right movement amount, and up-down movement amount) that will be described later.

The vehicle orientation detection ECU 40 is an electronic control device that includes a plurality of sensors (not shown) that can detect behaviors of the vehicle. Similar to the navigation ECU 10, the vehicle orientation detection ECU 40 includes a CPU and the like. In the present embodiment, sensors such as a gyro, a G-sensor, a yaw rate sensor or the like that can detect a vehicle rotation amount or movement amount are used to detect behaviors of the vehicle and thus detect orientation information of the vehicle. That is, similar to the facial orientation of the driver described earlier, the orientation information of the vehicle is detected using the six types of parameters (yaw rotation amount, roll rotation amount, pitch rotation amount, front-rear movement amount, left-right movement amount, and up-down movement amount). These will also be described later. Note that the vehicle behavior detection ECU 40 may correspond to "orientation information acquisition means" described in the claims.

The monitor ECU 50 is an electronic control device that includes a monitor screen (a liquid crystal display or plasma display) not shown in the drawings that can display the image information input through, for example, the on-board LAN. Similar to the navigation ECU 10, the monitor ECU 50 includes a CPU and the like. In the present embodiment, the monitor ECU 50 displays the shortest route and accompanying guidance information in a visibly recognizable manner for the driver after receiving route guidance information and the like output from the navigation ECU 10.

Here, a superimposed display function of the present navigation system will be described with reference to FIG. 2, as well as an overview of the following that actualize this function: the vehicle position detection unit 10b, display information acquisition unit 10c, the position relationship detection unit 10d, the 3D image conversion unit 10e, the display position determination unit 10f, and the display image generation unit 10g.

Figure 2B:
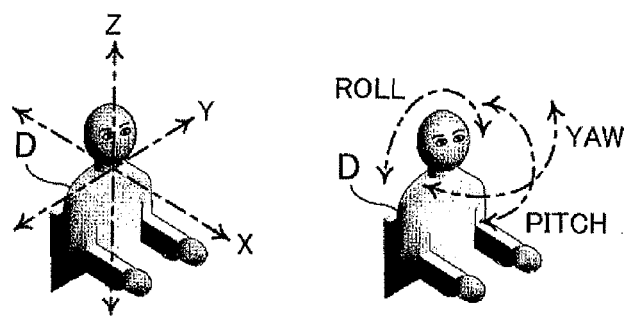
Figure 2C:
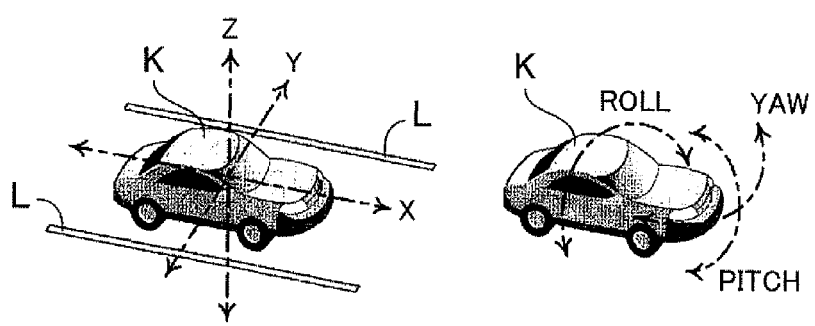

As shown in FIGS. 2A to 2C, with the superimposed display function according to the present embodiment, a position of a superimposed display is determined based on an actual position P at which an object (informational image) J displayed in a superimposed manner should exist in the landscape of a vehicle K, while taking into account the facial orientation of a driver D and the orientation of the vehicle K. Therefore, as the position relationship between a position Q of the vehicle and the actual position P at which the object J displayed in a superimposed manner should exist in the landscape, position information including a separation distance L between the two positions, a vertical difference V, and a horizontal difference H is acquired. In addition, the facial orientation information of the driver D and the orientation information of the vehicle K are acquired. Based on the position information, the orientation information, and the facial orientation information, a display position of the object J displayed by the HMD 17 or the HUD 18 is determined. Note that the vertical difference V is the amount of deviation in a vertical plane (X-Z plane) with respect to a reference axis X in the traveling direction, and the horizontal difference H is the amount of deviation in a horizontal plane (X-Y plane) with respect to the reference axis X in the traveling direction.

Accordingly, the display position of the object J displayed by the HMD 17 or the like is determined based on the actual position at which the object J should exist in the landscape, while taking into account the facial orientation of the driver D and the orientation of the vehicle K. Therefore, even when the landscape outside the host vehicle as seen by the driver D changes due to, for example, bouncing or up and down movements of the vehicle K, a superimposed display that follows such changes in the landscape is possible. In the present embodiment, in order to realize such a superimposed display, the navigation ECU 10 includes the vehicle position detection unit 10b, the display information acquisition unit 10c, and the position relationship detection unit 10d.

The vehicle position detection unit 10b has a function that identifies the position of the host vehicle. For example, based on the map information acquired from the map database 20 and the latitude/longitude absolute coordinate value information acquired from the GPS 12, the vehicle position detection unit 10b acquires information regarding the road currently traveled by the vehicle K, and a position in the front-rear direction relative to a given reference point (e.g., a distance between the host vehicle position and an intersection ahead). The vehicle position detection unit 10h then compares the lane information included in the road information (such as the absolute coordinate values of lines marked on the road surface, line colors, and line types) with the image information of the lanes acquired from the rear camera 15 to identify a position in the left-right direction (travel lane position) of the vehicle K. This makes it possible to identify, for example, how many meters the vehicle K is from the intersection ahead and which lane the vehicle K is traveling on.

The display information acquisition unit 10c has a function that acquires the object J to be displayed in a superimposed manner from the map database 20 or outside. In addition to that acquired from the map database 20, the object J includes, for example, an image or text guidance information (e.g., an arrow indicating the traveling direction on the recommended route, or text) generated by the navigation unit 10a, and position information regarding a vehicle or pedestrian ahead that can be acquired from the on-board cameras, a millimeter-wave sensor, an ultrasonic-wave sensor, or the like. Acquiring information related to the object J from the map database 20 can achieve a simpler apparatus configuration compared to separately providing an on-board camera or the like.

The position relationship detection unit 10d has a function that acquires, as the position information, the relationship between the position of the host vehicle (position of the vehicle K) and the actual position at which the object J displayed in a superimposed manner should exist in the landscape outside the vehicle. For example, as shown in FIG. 2A, the position information (the separation distance L, the vertical difference V, and the horizontal difference H) is acquired as the position relationship between the position Q of the vehicle and the actual position P at which the object J displayed in a superimposed manner should exist in the forward landscape of the vehicle K. Note that the vertical difference V is due to for example, a road grade (inclination angle) and is understood as the amount of deviation in the vertical plane (X-Z plane) with respect to the reference axis X in the traveling direction of the vehicle K. Therefore, the vertical difference V is can also be acquired as an angle θv viewed from a predetermined reference point set for the vehicle K. Further note that the position relationship detection unit 10d may correspond to "position information acquisition means" described in the claims.

The actual position at which the object J should exist in the forward landscape is identified from the map database 20 and the navigation unit 10a. For example, information that includes roads, traffic signals, signs, buildings, rivers, and other map information constituting the forward landscape is acquired from the map database 20, and the actual position is identified based on such information. Alternatively, the guidance information regarding the shortest route (a point at which a traveling direction arrow is displayed (route guidance point) and a point at which a destination mark is displayed (destination point)) is acquired from the navigation unit 10a, and such information is used to identify the actual position. The map information itself includes height information. Likewise, the guidance information includes height information for that which is displayed on the side of a destination building, such as a destination mark, or that which is displayed surrounding the destination building. Such information may be acquired from both the map database 20 and the navigation unit 10a to identify the actual position. In other words, the actual position in the forward landscape may be identified from at least one of the map database 20 and the navigation unit 10a.

The 3D image conversion unit 10e has a function that, based on information regarding the object J displayed in a superimposed manner that is output from the display information acquisition unit 10e, converts the object J into a 3D image such that the object J appears stereoscopic (three-dimensional) from the driver D's line of sight, and also generates a 2D image. That is, if the object J has no height (e.g., a road surface marking), the object J is usually stored in the map database 20 as 2D information, and the 3D image conversion unit 10e therefore generates an applicable 2D image based on such information. Even if the height information exists, the visibly recognizable size and visually perceived impression by the driver D differ depending on the length of the separation distance L, such that "a distant view appears small and planar, and a near view appears to stand tall and stereoscopic." Therefore, even if the object J is a 2D image, the 3D image conversion process is performed based on the separation distance L. Note that the 3D image conversion process used is known, and therefore the information processing will not be described in detail here.

The display position determination unit 10f has a function that determines the display position of the object J displayed by the HMD 17 or the like based on the position information, the orientation information, and the facial orientation information. Here, the "facial orientation information" of the driver D is output from the facial orientation recognition ECU 30, and the facial orientation of the driver D is detected using the six types of parameters (yaw rotation amount, roll rotation amount, pitch rotation amount, front-rear movement amount, left-right movement amount, and up-down movement amount). These will be described with reference to FIG. 2B. Note that the display position determination unit 10f may correspond to "display position determination means" described in the claims.

As shown in FIG. 2B, with the face of the driver D facing in the forward direction of the vehicle K, the X axis is defined as passing through the center of a line that connects both shoulders of the driver D in the vehicle front-rear direction; the Y axis is defined as passing through the same center in the vehicle left-right direction; and the Z axis is defined as passing through the same center in the vehicle height direction. Thus, (1) the head yaw rotation amount is defined as the rotation amount around the Z axis (X-Y plane), (2) the head pitch rotation amount is defined as the rotation amount around the Y axis (X-Z plane), and (3) the head roll rotation amount is defined as the rotation amount around the X axis (Y-Z plane). Assuming translation with respect to each of the three axes X, Y, and Z, (4) the head front-rear movement amount is defined as the movement amount in the X-axis direction, (5) the head left-right movement amount is defined as the movement amount in the Y-axis direction, and (6) the head up-down movement amount is defined as the movement amount in the Z-axis direction. By defining a total of six types of parameters consisting of the three types of rotation amounts and the three types of movement amounts, the facial orientation information of the driver D can be accurately acquired. Note that the facial orientation information of the driver D can be acquired using the rotation amounts of yaw, pitch, and roll alone. Therefore, if simpler information processing is prioritized over accuracy, the facial orientation information of the driver D may be acquired using the three types of rotation amounts alone.

The "orientation information" of the vehicle K is output from the vehicle orientation detection ECU 40, and also detected using the six types of parameters (yaw rotation amount, roll rotation amount, pitch rotation amount, front-rear movement amount, left-right movement amount, and up-down movement amount).

In other words, as shown in FIG. 2C, the X axis may be defined as the roll center of the vehicle K stopped in the center of the road (if there are road boundary lines L, in the center between the left and right road boundary lines L), the Y axis may be defined as a line segment that passes through the X axis horizontal to the road surface (e.g., the center of gravity in the front-rear direction on the X axis) and is perpendicular to the road boundary lines L, and the Z axis may be defined as a line segment that passes through an intersection of the X axis and the Y axis and is perpendicular to the road surface. In such case, (1) the vehicle yaw rotation amount is defined as the rotation amount around the Z axis (X-Y plane), (2) the vehicle pitch rotation amount is defined as the rotation amount around the Y axis (X-Z plane), (3) the vehicle roll rotation amount is defined as the rotation amount around the X axis (Y-Z plane), (4) the vehicle front-rear movement amount is defined as the movement amount in the X-axis direction, (5) the vehicle left-right movement amount is defined as the movement amount in the Y-axis direction, and (6) the vehicle up-down movement amount is defined as the movement amount in the Z-axis direction. Similar to the "facial orientation information" of the driver D, by defining a total of six types of parameters consisting of the three types of rotation amounts and the three types of movement amounts, the orientation information of the vehicle K can be accurately acquired. Note that the orientation information of the vehicle K can be acquired using the rotation amounts of yaw, pitch, and roll alone. Therefore, if simpler information processing is prioritized over accuracy, the orientation information of the vehicle K may be acquired using the three types of rotation amounts alone.

The display image generation unit 10g has a function that performs a display control to display the object J on the HMD 17 or the like at the display position determined by the display position determination unit 10f. Two methods are associated with this function, and will be described in detail later with reference to FIG. 4. Note that the display image generation unit 10g may correspond to "display control means" described in the claims.

Figure 3:
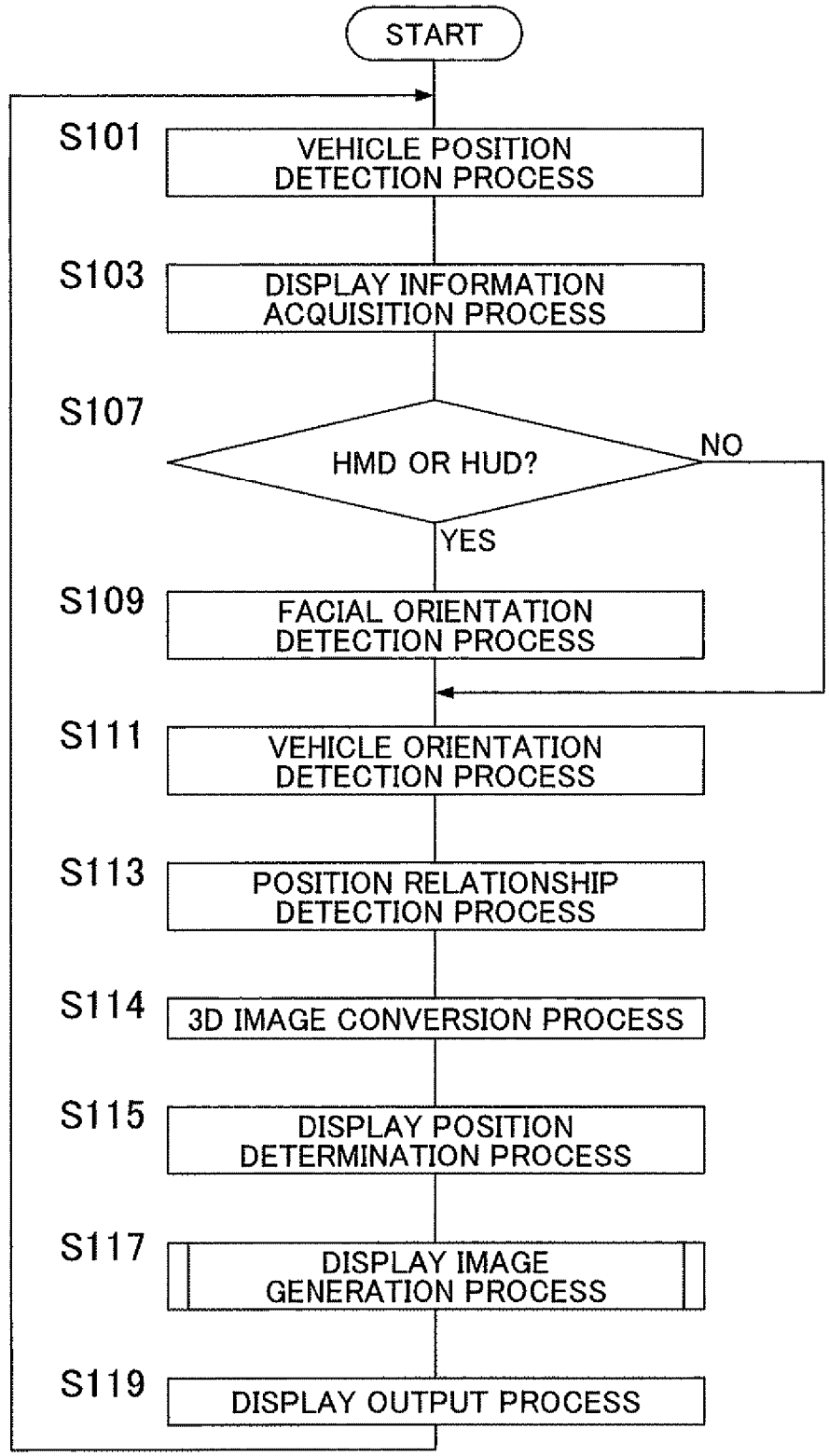
FIG. 3 is a flowchart that shows the flow of a superimposed display process.

By thus configuring the navigation system, as shown in FIG. 3, the navigation ECU 10 performs a superimposed display process. The process starts with the navigation unit 10a as soon as the navigation ECU 10 is powered on, for example. After a predetermined initialization process in which work areas reserved for the semiconductor memory, and register flags are cleared, steps S101 to S119 described below are repeatedly executed, for example, every 100 milliseconds.

As shown in FIG. 3, in the superimposed display process, first, a vehicle position detection process is performed at step S101. The vehicle position detection unit 10b performs the process to identify the position of the host vehicle. In the present embodiment, the vehicle position detection unit 10b identifies, using the position in the front-rear direction and the position in the left-right direction of the vehicle K, the current absolute coordinate values of the host vehicle and the lane position of the road currently traveled by the host vehicle.

At step S103, a display information acquisition process is performed. The display information acquisition unit 10c performs the process to acquire information (prescribed information) regarding the object J displayed in a superimposed manner from the map database 20 or the like. If a road surface marking (e.g., a zebra marking (pedestrian crossing)) on the road traveled by the vehicle K is acquired as the object J from the map database 20, the display information acquisition unit 10c acquires the latitude/longitude absolute coordinate value information regarding the zebra marking ahead near the host vehicle based on the position of the host vehicle acquired at step S101.

Next, at step S107, a display type determination process is performed. In this process, it is determined from hardware structure information of the pre-configured navigation ECU 10 whether the display connected to the navigation ECU 10 is an HMD or an HUD. If the navigation ECU 10 is connected to either the HMD 17 or the HUD 18 (S107: Yes), a facial orientation detection process must be performed and the routine therefore proceeds next to step S109.

However, if neither the HMD 17 nor the HUD 18 is connected to the navigation ECU 10 (S107: No), the navigation ECU 10 outputs to the monitor ECU 50 and the facial orientation detection process at step S109 is not needed. Therefore, the routine skips step S109 and proceeds to step S111.

Here, the HMD 17 is assumed to be connected to the navigation ECU 10, and the facial orientation detection process at step S109 is performed. The facial orientation recognition ECU 30 performs this process, and as described above, uses the six types of parameters (yaw rotation amount, roll rotation amount, pitch rotation amount, front-rear movement amount, left-right movement amount, and up-down movement amount) to detect the facial orientation information, i.e., the facial orientation of the driver D. Here, the driver D is assumed to have a facial orientation rotated upward by 10 degrees (the pitch rotation amount is +10 degrees). Note that S109 may correspond to the "facial orientation information acquisition means" described in the claims.

Next, at step S111, a vehicle orientation detection process is performed. The vehicle orientation detection ECU 40 performs the process, and as described above, uses the six types of parameters (yaw rotation amount, roll rotation amount, pitch rotation amount, front-rear movement amount, left-right movement amount, and up-down movement amount) to detect the orientation information, i.e., the behavior of the vehicle K. Here, the vehicle K is assumed to have rotated forwardly downward only by 5 degrees (the pitch rotation amount is −5 degrees). Note that S111 may correspond to the "orientation information acquisition means" described in the claims.

Next, at step S113, a position relationship detection process is performed. The position relationship detection unit 10d performs the process to acquire, as the position information, the relationship between the position of the host vehicle (position of the vehicle K) and the actual position at which the object J displayed in a superimposed manner should exist in the landscape outside the vehicle. In the previous example, if the separation distance L is 50 meters and a road inclination angle θv is a 3-degree incline as the position relationship between the object J and the position Q of the vehicle K, the vertical difference V is the inclination angle. The object J is assumed to be positioned in front of the vehicle K in the traveling direction (in the direction of the X axis), and the horizontal difference H is zero meters. Note that step S113 may correspond to the "position information acquisition means" described in the claims.

At step S114, a 3D image conversion process is performed. The 3D image conversion unit 10e performs the process to convert an image based on the separation distance L between the host vehicle position and the object J such that the object J appears stereoscopic from the line of sight of the driver D. In the previous zebra marking example, the 3D image conversion unit 10e converts the flat and rectangular zebra marking into a 3D image based on the separation distance L (e.g., 50 meters) such that the zebra marking appears trapezoidal from the line of sight of the driver D.

At step S115, a display position determination process is performed. The display position determination unit 10f performs the process as shown in FIG. 1 to determine the display position of the object J converted into a 3D image, based on the facial orientation information from the facial orientation recognition ECU 30 (S109), the orientation information from the vehicle orientation detection ECU 40 (S111), and the position information from the position relationship detection unit 10d (S113). Specifically, the display position determination unit 10f performs an addition operation for each of the six types of parameters (yaw rotation amount, roll rotation amount, pitch rotation amount, front-rear movement amount, left-right movement amount, and up-down movement amount). The separation distance L is added to the front-rear movement amount, and the horizontal difference H is added to the left-right movement amount. The vertical difference V is added to the up-down movement amount if acquired as a distance, and added to the pitch rotation amount if acquired as an inclination angle.

For example, in the previous case, the driver D has a facial orientation rotated upward by 10 degrees (the pitch rotation amount is +10 degrees), and the vehicle K has rotated forwardly downward by 5 degrees (the pitch rotation amount is −5 degrees). Furthermore, as the position relationship between the object J and the vehicle K, the road inclination angle θv is a 3-degree incline. Therefore, the total rotation amount around the Y axis (pitch) is 8 degrees (=10+(−5)+3), the rotation amount around the X axis (roll) and the rotation amount around the Z axis (yaw) are both 0 (zero) degrees. Thus, the position at which the object J is rotated upward around the Y axis (pitch) by +8 degrees is determined to be the display position on the HMD 17. In this example, the deviation direction of the facial orientation of the driver D and the deviation direction of the orientation of the vehicle K are set as the same direction around the Y axis (pitch) for ease of understanding.

Next, at step S117, a display image generation process is performed. The details of this process are given in FIG. 4. Hereinafter, the description will refer to FIGS. 4 and 5. Note that step S117 and the next step S119 may correspond to the "display control means" described in the claims.

Figure 4A:
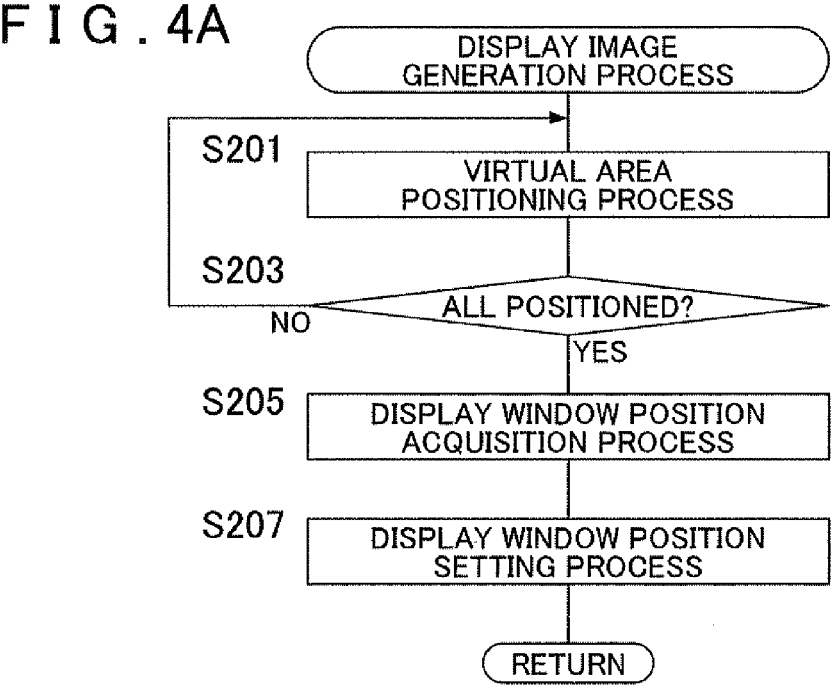
FIG. 4 shows flowcharts of the flow of a display image generation process shown in FIG. 3.
Figure 5A:
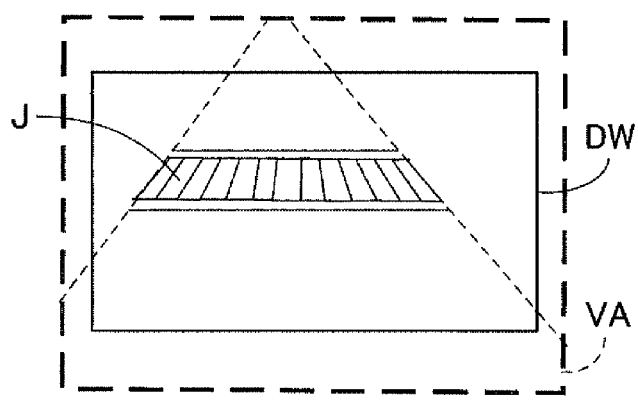
FIG. 5 shows explanatory diagrams of an example of a superimposed display and the like provided by the present navigation system.
Figure 5B:
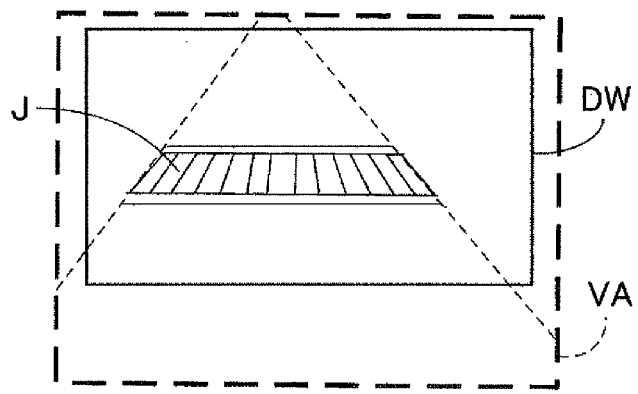

As shown in FIG. 4A, first, at steps S201 and S203 in the display image generation process, all objects included in the forward landscape of the vehicle K as seen by the driver that may displayed in a superimposed manner are positioned in a virtual area VA. The virtual area VA is, for example, a storage area for information processing reserved in a work area of the semiconductor memory of the navigation ECU 10. As an example, a conceptualized virtual area VA is illustrated in FIGS. 5A and 5B.

Figure 5C:
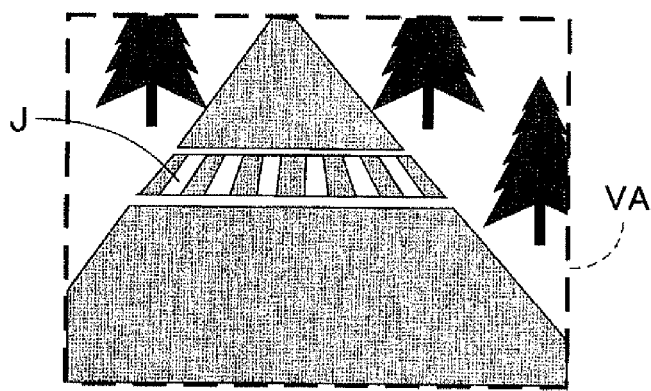

FIG. 5C is an explanatory diagram that roughly indicates the range of the virtual area VA under the assumption that all that fits in the virtual area VA is displayed, and does not mean that all objects J or the landscape in the virtual area VA as illustrated in FIG. 5C are positioned in the virtual area VA. Step S201 may correspond to "informational image positioning means" described in the claims.

When the positioning at step S201 is complete, (S203: Yes), processing to acquire the position of a display window DW is next performed at step S205. The display window DW covers a smaller area than the virtual area VA and can be set at any position within the virtual area VA. Here, the display window DW is positioned at the display position of the object J determined at step S115. Based on this, the setting position of the display window DW is changed at step S207. Note that, in terms of outputting the object J in the display window DW to the display at step S119, step S207 may correspond to "display object selection means" described in the claims.

For example, in the previous case, the position at which the object J is rotated upward around the Y axis (pitch) by +8 degrees is determined to be the display position on the HMD 17. Therefore, the position of the display window DW is changed from the position of the display window DW shown in FIG. 5A to the position rotated upward by 8 degrees (FIG. 8B). In other words, due to the driver D's line of sight moving to a position rotated upward by 8 degrees, the object J (the zebra marking) appears closer to the vehicle K. Note that the dashed lines in the virtual area VA shown in FIGS. 5A and 5B represent the positions of both sides of the road traveled by the vehicle K for convenience, and are not meant to be displayed as the object J.

When this process is complete, the routine proceeds to step S119 shown in FIG. 3 to output the object J in the display window DW to the HMD 17 or the HUD 18. On the HMD 17, a virtual road marking or the like on the road surface (the object J) is displayed in a superimposed manner on the surrounding landscape at the actual position P. Therefore, the driver D of the vehicle K can visibly recognize such a road marking or the like (the object J) even if forward visibility is not good, such as when driving at night. Besides virtual road markings or the like on the road surface, a route guidance display that is guided by the navigation unit 10a of the navigation ECU 10 (e.g., an arrow indicating the traveling direction on the recommended route, or text information) is also similarly displayed in a superimposed manner in the vision range of the driver D. Therefore, the driver D can be notified of such guidance content without requiring the driver D to turn their attention to the monitor screen of the monitor ECU 50.

If neither the HMD 17 nor the HUD 18 is connected to the navigation ECU 10 according to the display type determination process at step S107, the object J in the display window DW is output to the monitor ECU 50 at step S119. Note that, in this case, the forward landscape of the vehicle K such as shown in FIG. 5C must be captured by the on-board cameras (not shown) and displayed on the monitor screen of the monitor ECU 50, with the object J displayed in a superimposed manner on the landscape.

As described above, with the present navigation system, the position relationship detection unit 10d acquires the position information (the separation distance L, the vertical difference V (or the inclination angle θv), and the horizontal difference H) indicative of the relationship between the position Q of the vehicle K and the actual position P at which the object J (informational image) displayed in a superimposed manner should exist in the landscape. The vehicle orientation detection ECU 40 acquires the orientation information (yaw rotation amount, roll rotation amount, pitch rotation amount, front-rear movement amount, left-right movement amount, and up-down movement amount) of the vehicle K. The facial orientation recognition ECU 30 acquires the facial orientation information (yaw rotation amount, roll rotation amount, pitch rotation amount, front-rear movement amount, left-right movement amount, and up-down movement amount) of the driver D. The display position determination unit 10f determines the display position of the object J to be displayed on the HMD 17 or the HUD 18 based on the position information, the orientation information, and the facial orientation information. Then, the display image generation unit 10g controls the HMD 17 or the like to display the object J at the display position determined by the display position determination unit 10f.

Accordingly, the display position of the object J displayed by the HMD 17 or the like is determined based on the actual position P at which the object J should exist in the landscape, while taking into account the facial orientation of the driver D and the orientation of the vehicle K. Therefore, even when the landscape outside the host vehicle as seen by the driver D changes due to, for example, bouncing or up and down movement of the vehicle K, a superimposed display that follows such changes in the landscape is possible. Therefore, the positioning accuracy of the superimposed display can be improved.

As an example of the display image generation process at step S117 shown in FIG. 3, by employing the configuration shown in FIG. 4A, the display image generation unit 10g positions the object J in the virtual area VA through a virtual area positioning process (S201), and determines the position of the display window DW through a display window setting process (S207) so as to position the object J in the display window DW on the HMD 17 or the like. Once the object J is positioned in the virtual area VA, in a subsequent process, the position of the display window DW is changed based on the display position determined by the display position determination unit 10f. Therefore, the algorithm associated with the display image generation unit 10g can be made simpler compared to when no such virtual area VA is utilized and it is determined whether every object J fits in the display window DW based on the display position determined by the display position determination unit 10f (FIG. 4B).

Figure 4B:
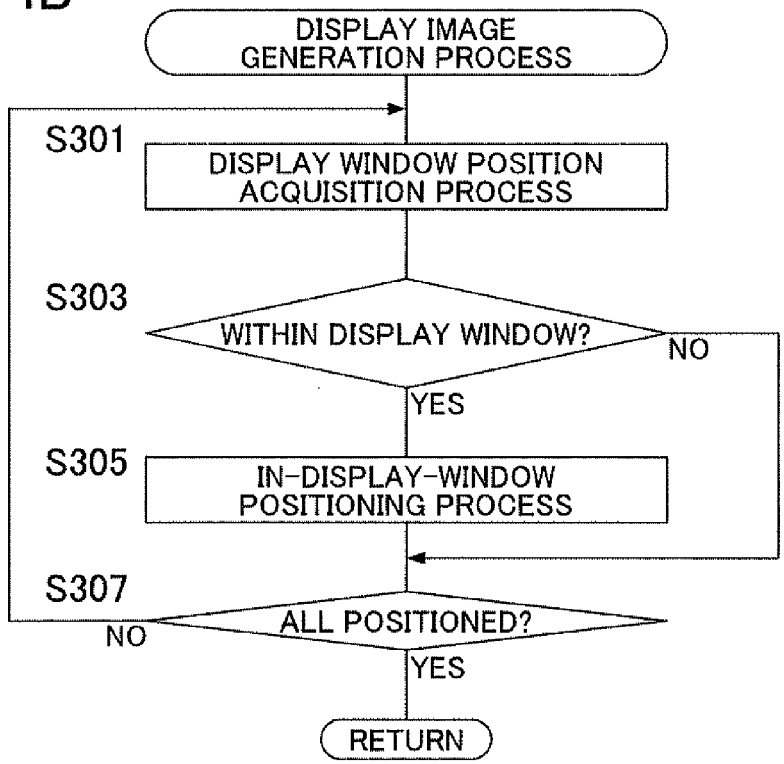

As another example of the display image generation process at step S117 shown in FIG. 3, a configuration shown in FIG. 4B may also be employed. More specifically, at step S301, a process to acquire the position of the display window DW is performed, and a subsequent process is performed to determine whether the display position of the object J is in the display window DW. That is, for every object J, it is determined whether the position of the object J fits in the display window DW. If there is an object J whose display position is within the display window DW (S303: Yes), the object J is positioned in the display window DW at step S305 next; if not (S303: No), the object J is not positioned in the display window DW.

Until the positioning of all applicable objects J is complete (S307: Yes), the processing at steps S301, S303, and S305 is repeated (S307: No). In this manner, only those that fit in the display window DW are positioned in the display window DW. Therefore, the processing speed associated with the display image generation unit 10g can be increased compared to when all of the objects J are temporarily positioned in the virtual area VA (FIG. 4A). In other words, the algorithm is expected to increase the speed of processing when the total number of objects J is large but the number of objects J to be positioned in the display window DW is small.

The embodiment described above illustrates an example of a superimposed display relative to the forward landscape of the vehicle K as seen by the driver D. However, the present invention is not limited to this example. The present invention may also be similarly applied to, for example, a sideward landscape or a rearward landscape of the vehicle K as seen by the driver D, and effects and advantages similar to those described above can be obtained. Although the above example uses the driver D as the subject, effects and advantages similar to those described above can be obtained with any person wearing the HMD 17 or anything mounted with the HUD 18.

The embodiment described above assumes that the HMD 17 is connected to the navigation ECU 10. However, if the HUD 18 is connected to the navigation ECU 10, acquiring the facial orientation information based on changes in the position of the eye point of the driver D enables further improvement to the positioning accuracy of the superimposed display. Note that the eye point is the center between both eyes of the driver D as described above.

Figure 6A:
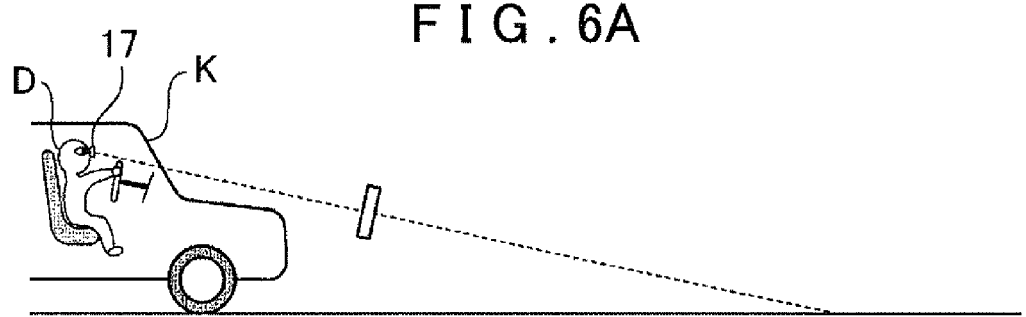
FIG. 6 shows explanatory diagrams that explain an example of processing performed in a display position determination process when an object is output to an HMD.

As described above, the HMD 17 is mounted as shown in FIG. 6A on the head of the driver D if the object J to be displayed in a superimposed manner on the outside landscape as a virtual image is output to the HMD 17. The driver D thus sees the outside landscape of the vehicle K with the object J superimposed thereon through the HMD 17 whose position changes with the head. Note that a vertically long rectangle on the dashed line or the dotted line extending forward of the vehicle K from the heads of the driver D, a driver D', or a driver D" shown in FIGS. 6 to 8 indicates a "virtual image" displayed by the HMD 17 or the HUD 18.

Figure 6B:
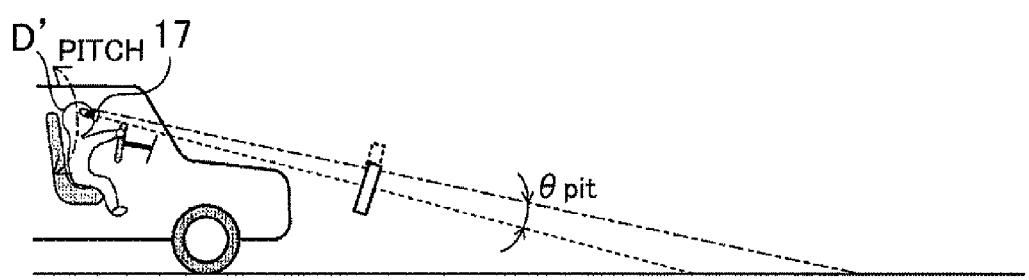

For example, as shown in FIG. 6B, if the head of the driver D' rotates in the pitch direction, the HMD 17 also rotates and moves in the pitch direction together with the head. Therefore, the display position determination process (S115) performs addition processing for a pitch rotation amount θpit. Thus, when the head of the driver D' rotates downward, the pre-rotation display window DW (see FIG. 5) is rotated downward by θpit in the pitch direction to make the object J appear to the driver D' to be superimposed at the correct position. Note that, although not shown in FIG. 6, the display window DW covers a smaller area than the virtual area VA and can be set at any position within the virtual area VA, as described with reference to FIG. 5. (The same applies hereinafter, as well as to FIGS. 7 and 8.)

Figure 6C:
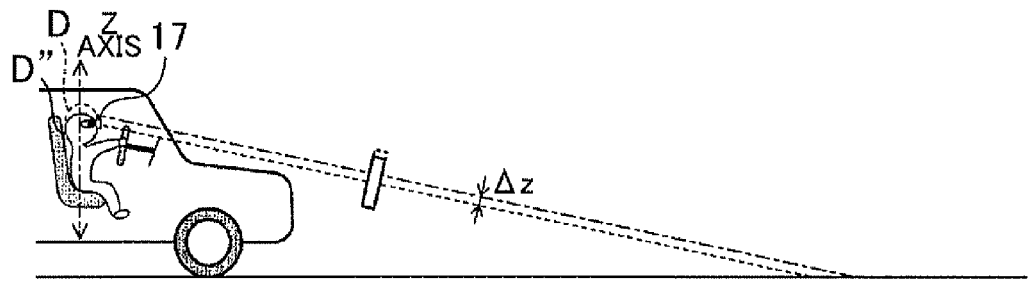

In addition, as shown in FIG. 6C, if the head of the driver D" moves in the Z-axis direction, the HMD 17 also moves up and down in the Z-axis direction together with the head. Therefore, the display position determination process (S115) performs addition processing for an up-down movement amount Δz. Thus, when the head of the driver D" is oriented downward, the pre-movement display window DW is moved downward by Δz in the Z-axis direction to make the object J appear to the driver D" to be superimposed at the correct position.

Note that in both cases, the display position of the display window DW is determined through the display position determination process at step S115 described above.

Figure 7A:
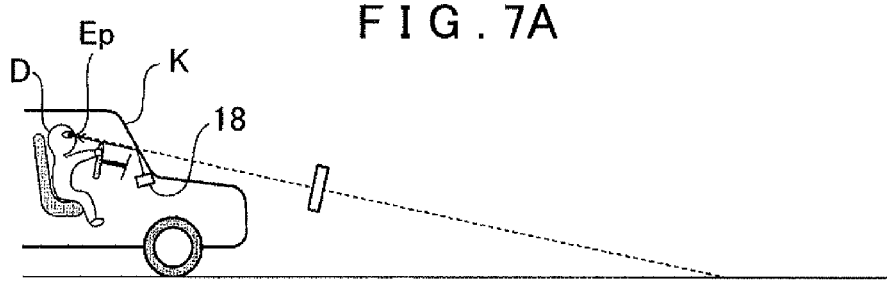
FIG. 7 shows explanatory diagrams that explain an example of processing performed in the display position determination process when an object is output to an HUD.

However, the HUD 18 is configured as shown in FIG. 7A on the dashboard or the like so as to be capable of projecting the object J on the windshield of the vehicle K if the object J to be displayed in a superimposed manner on the outside landscape as a virtual image is output to the HUD 18. Therefore, unlike the HMD 17, the HUD 18 does not rotate or move together with the head of the driver D. In other words, the driver D sees the object J superimposed on the landscape outside the vehicle K in a projection on the windshield, regardless of the position of their head.

Figure 7B:
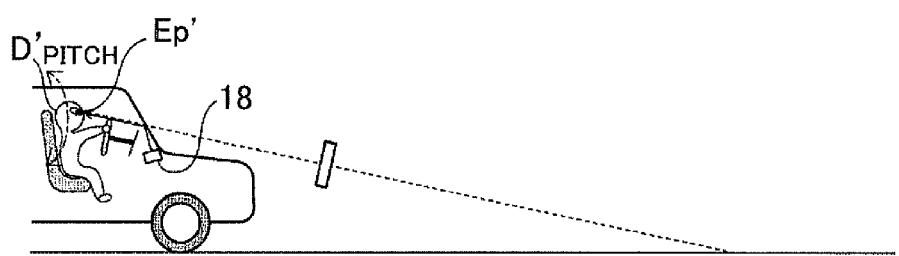

Hence, as shown in FIG. 7B for example, because the HUD 18 itself does not rotate even when the head of the driver D' rotates in the pitch direction, the display position of the object J does not change and the eye point Ep of the driver D' looking at the forward landscape also hardly changes. In other words, there is almost no need to change the superimposed position of the object J as seen by the driver D', even when their head rotates in the pitch direction. Therefore, the addition processing required in the case of the HMD 17 for the pitch rotation amount in the display position determination process (S115) is not required.

Figure 7C:
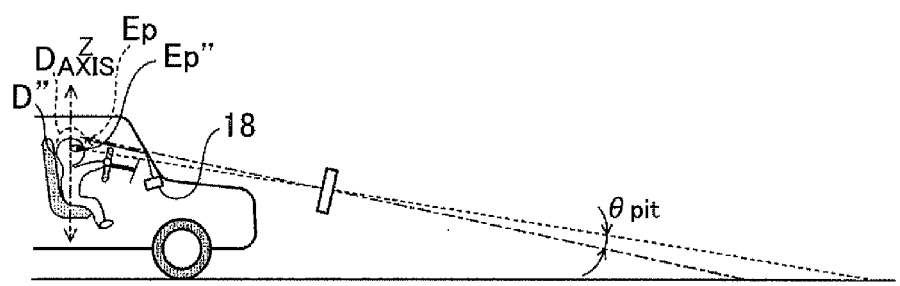

Meanwhile, as shown in FIG. 7C, although the HUD 18 itself does not move up or down when the head of the driver D" moves in the Z-axis direction, the driver D" has an eye point Ep" for looking up from below or looking down from above at the object J projected on the windshield of the vehicle K. Therefore, in addition to the addition processing associated with the up-down movement of the display window DW in the Z-axis direction, addition processing for the pitch rotation amount is required to rotate the display window DW in the pitch direction by the angle $\theta$pit caused by the deviation in the eye point Ep".

In other words, the addition processing for the pitch rotation amount is further performed on the display window DW moved up or down in the Z-axis direction such that the display window DW rotates so as to appear pulled toward the rear of the vehicle K (forward) when the driver D" looks up at the object J, and the display window DW rotates so as to appear pushed toward the front of the vehicle K (outward) when driver D" looks down at the object J. Accordingly, even if the position of the eye point Ep" of the driver D" changes, the form of the object J is corrected by rotation in the pitch direction in addition to movement in the Z-axis direction. Therefore, the object J appears to the driver D" to be superimposed at a naturally correct position.

Thus, when the HUD 18 is connected to the navigation ECU 10, a change in the position of the eye point Ep of the driver D must be calculated as a rotation amount of the display window DW. Hereinafter, the content of this calculation process will be described with reference to FIG. 8.

Figure 8A:
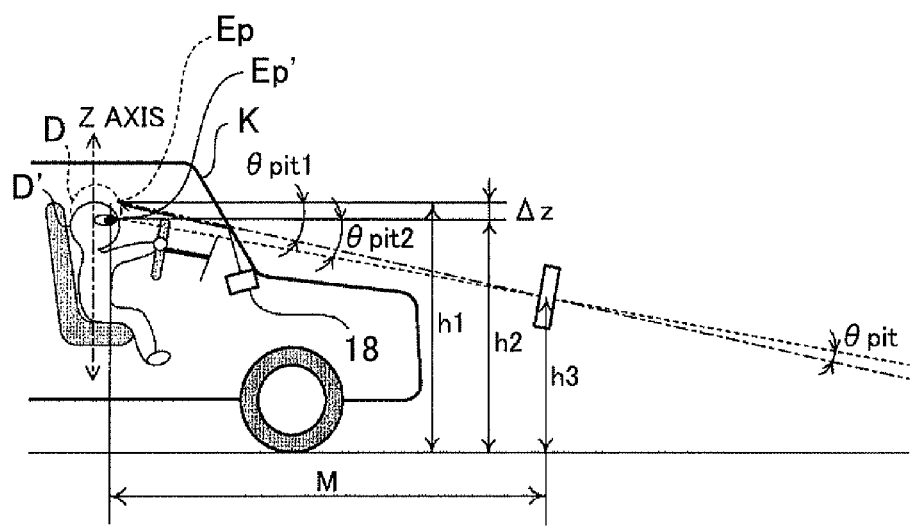
FIG. 8 shows explanatory diagrams that explain another example of processing performed in the display position determination process that considers a change in the position of the driver's eye point as facial orientation information.
Figure 8B:
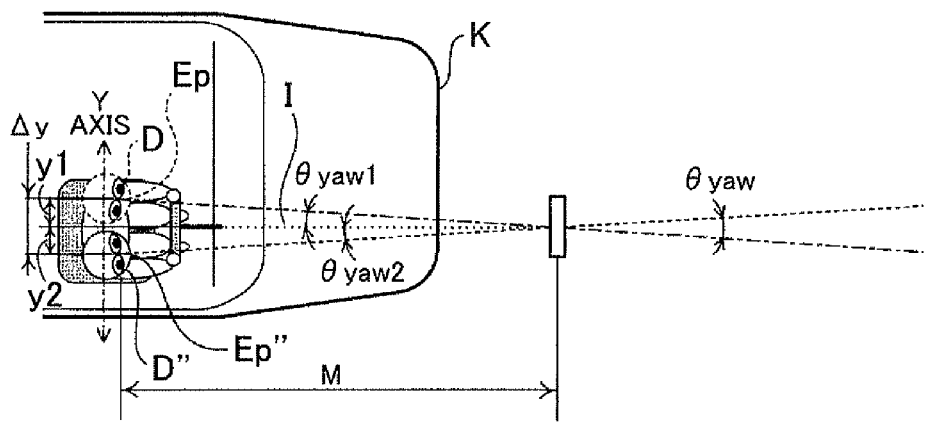

As shown in FIG. 8A, a change in the position of the eye point Ep when the head of the driver D moves in the Z-axis direction can be acquired as the rotation amount $\theta$pit of the head of the driver D'. Specifically, if M is a horizontal distance from the eye points Ep and Ep' of the drivers D and D' to the virtual image of the HUD 18, and h3 is a height of the virtual image from the ground, the rotation amount $\theta$pit can be calculated as a difference between $\theta$pit1 and $\theta$pit2, that is, $\theta$pit=$\theta$pit2−$\theta$pit1, where, $\theta$pit1 is the rotation amount of the display window DW before the head of the driver D moves in the Z-axis direction as expressed by $\theta$pit1=arc tan((h1−h3)/M), and $\theta$pit2 is the rotation amount of the display window DW after the head of the driver D' moves in the Z-axis direction as expressed by $\theta$pit2=arc tan((h2−h3)/M). Here, h1 is a height from the ground to the eye point Ep before the up-down movement, and h2 is a height from the ground to the eye point Ep after the up-down movement.

As shown in FIG. 8B, a change in the position of the eye point Ep when the head of the driver D moves left or right in the Y-axis direction can be acquired as the rotation amount $\theta$yaw of the head of the driver D". Specifically, if M is a horizontal distance from the eye points Ep and Ep" of the drivers D and D" to the virtual image of the HUD 18, the rotation amount $\theta$yaw can be calculated as a difference between $\theta$yaw1 and $\theta$yaw2, that is, $\theta$yaw=$\theta$yaw2−$\theta$yaw1, where, $\theta$yaw1 is the rotation amount of the display window DW before the head of the driver D moves in the Y-axis direction as expressed by $\theta$yaw1=arc tan(y1/M), and $\theta$yaw2 is the rotation amount of the display window DW after the head of the driver D" moves in the Y-axis direction as expressed by $\theta$yaw2=arc tan(y2/M). Here, y1 is a distance from a center axis I (a dotted line shown in FIG. 8B) perpendicular to the front of the HUD 18 to the eye point Ep before the left-right movement, and y2 is a distance from the center axis I to the eye point Ep" after the left-right movement.

Thus, if the object J is output to the HUD 18, translation amounts of the display window DW in the up-down direction and the left-right direction must be acquired when the head of the driver D moves in the Z-axis direction or the Y-axis direction. In addition, $\theta$pit and $\theta$yaw must be acquired through the calculation process described above to rotate the display window DW. Hereinafter, a specific flow of information processing will be described with reference to FIG. 9. Note that such processing will be described as another example of the information processing of the display position determination process (S115) shown in FIG. 3.

Figure 9:
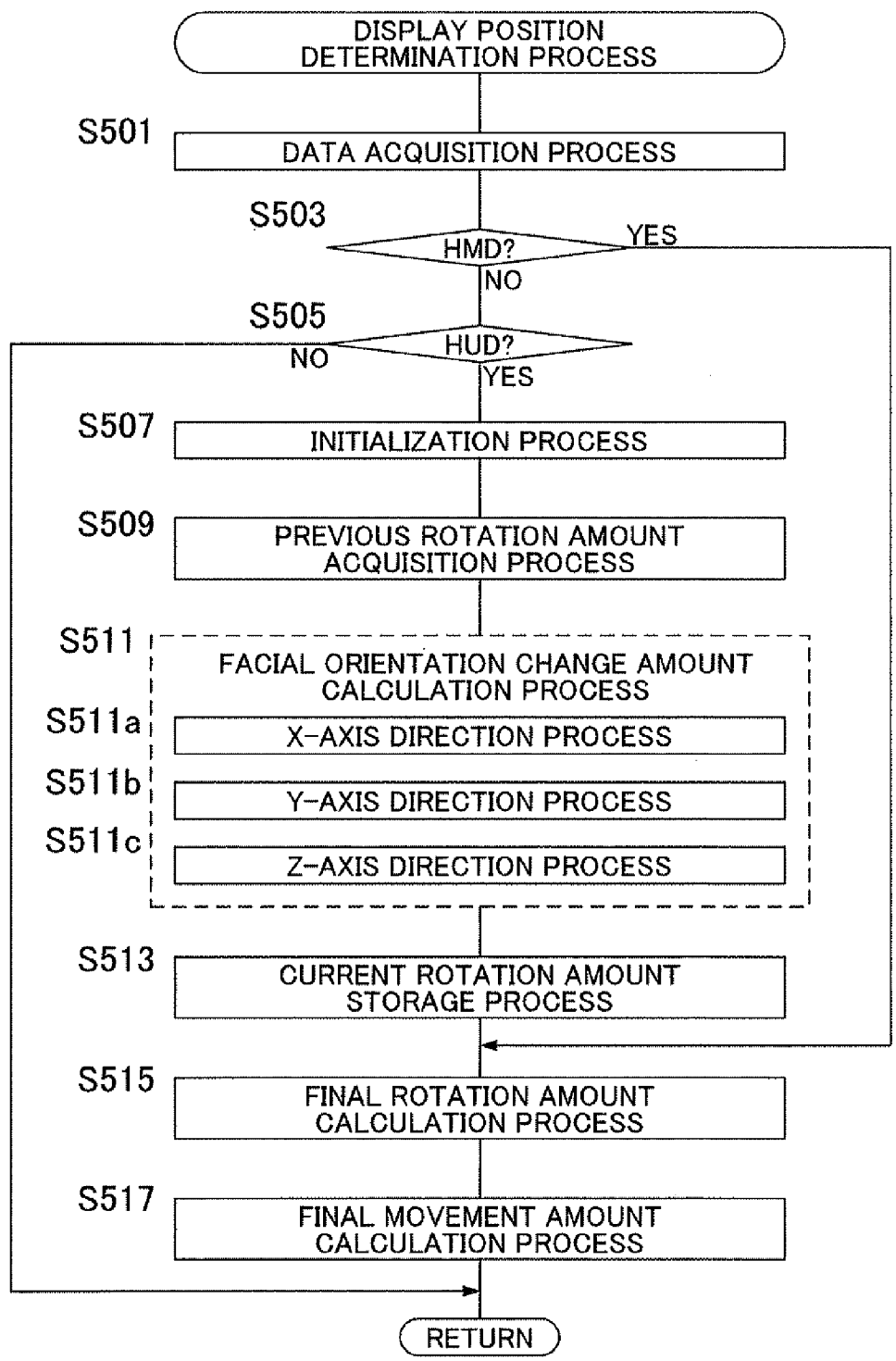
FIG. 9 is a flowchart that shows the flow of another example of information processing performed in the display position determination process shown in FIG. 8.

As shown in FIG. 9, in the display position determination process, first, a data acquisition process is performed at step S501. This process acquires the facial orientation information (yaw rotation amount, roll rotation amount, pitch rotation amount, front-rear movement amount, left-right movement amount, and up-down movement amount) detected in the facial orientation detection process at step S109 from the facial orientation recognition ECU 30; the orientation information of the vehicle K (yaw rotation amount, roll rotation amount, pitch rotation amount, front-rear movement amount, left-right movement amount, and up-down movement amount) detected in the vehicle orientation detection process at step S111 from the vehicle orientation detection ECU 40; and the position information (position relationship between the host vehicle position and the position at which the object J should actually exist) detected in the position relationship detection process at step S113 from the position relationship detection unit 10*d*.

Next, at step S503, a process that determines whether the display is the HMD 17 is performed. In this process, a determination is made based on the hardware structure information of the pre-configured navigation ECU 10. If it is determined at step S503 that the HMD 17 is connected (S503: Yes), no special processing is required in this case as described with reference to FIG. 6. Therefore, similar to the display position determination process at step S115, a final rotation amount calculation process at step S515 and a final movement amount calculation process at step S517 are performed.

In other words, based on the facial orientation information acquired at step S501 by the facial orientation recognition ECU 30 (S109), the orientation information acquired by the vehicle orientation detection ECU 40 (S111), and the position information acquired by the position relationship detection unit 10*d* (S113), the display position of the object J converted into a 3D image is determined by an addition operation for each of the six types of parameters (yaw rotation amount, roll rotation amount, pitch rotation amount, front-rear movement amount, left-right movement amount, and up-down movement amount). Note that the separation distance M is added to the front-rear movement amount, and the horizontal difference H is added to the left-right movement amount. The vertical difference V is added to the up-down movement amount if acquired as a distance, and added to the pitch rotation amount if acquired as an inclination angle.

However, if it is determined at step S503 that the HMD 17 is not connected (S503: No), it is next determined at step S505 whether the HUD 18 is connected based on the hardware structure information of the navigation ECU 10. If it is determined that the HUD 18 is connected (S505: Yes), the routine next proceeds to step S507. If it is determined that the HUD 18 is not connected (S505: No), the display position determination process is ended and the routine proceeds to step S117 shown in FIG. 3 to perform the display image generation process that outputs to the monitor screen through the monitor ECU 50.

At step S507, an initialization process is performed. This process is performed if no correction to the rotation amount based on the facial orientation was made in the previous process, and sets the yaw rotation amount, the roll rotation amount, and the pitch rotation amount that constitute the facial orientation information all to 0 (zero). In addition, the "horizontal distance M from the eye point Ep of the driver D to the virtual image of the HUD 18" and the "height h3 of the virtual image from the ground" that are pre-stored in the navigation ECU 10 or the like are acquired. Note that the height h3 of the virtual image from the ground is the sum of a predetermined value added to a sitting height of the driver D and may thus change depending on individual differences in the sitting heights of various drivers D. However, the sitting height can be directly or indirectly detected as an adjusted value of the height of the driver's seat. Therefore, the height h3 of the virtual image from the ground can also be acquired.

Next, at step S509, a previous rotation amount acquisition process for the display window DW is performed. In this process, the previous rotation amounts (yaw rotation amount, roll rotation amount, and pitch rotation amount) of the display window DW, which were calculated when the display position determination process was previously performed and stored at step S513, are acquired as previous rotation amounts ($\theta yaw1$, $\theta roll$, and $\theta pit1$). Based on these, a facial orientation change amount calculation process is subsequently performed.

At step S511, the facial orientation change amount calculation process is performed. This process calculates the rotation amount of the display window DW and a facial orientation change amount through the calculation process described with reference to FIG. 8, for each moving direction (X-axis (front-rear) direction, Y-axis (left-right) direction, and Z-axis (up-down) direction) based on the moving direction of the head of the driver D. This process is divided into the three steps S511a, S511b, and S511c for each of the moving directions. At steps S511a to S511c, whether the head moved in each of the directions is determined based on the facial orientation information (yaw rotation amount, roll rotation amount, pitch rotation amount, front-rear movement amount, left-right movement amount, and up-down movement amount of the head) acquired at step S501.

At step S511a, if the head of the driver D moved in the X-axis direction i.e., the front-rear direction of the vehicle K (or if a head front-rear movement amount is detected), the movement amount is used as a movement amount in the X-axis direction at step S517 described later. Note that the head movement in the X-axis direction is not directly related to the rotation amounts of the head and the display window DW calculated in this display position determination process.

At step S511b, if the head of the driver D moved in the Y-axis direction i.e., the width direction of the vehicle K (or if a head left-right movement amount is detected), the movement amount is used as a movement amount in the Y-axis direction at step S517 described later.

Using the current position of the face in the Y-axis direction (a distance y2 from the center axis I of the HUD 18 to the eye point Ep) that is acquired from the facial orientation information detected in the facial orientation detection process (S109) and the horizontal distance M from the eye point Ep of the driver D to the virtual image of the HUD 18, the current rotation amount $\theta yaw2$ of the display window DW is calculated as $\theta yaw2 = \arctan(y2/M)$. The previous calculation result, i.e., the previous rotation amount $\theta yaw1$, is subtracted from the current rotation amount $\theta yaw2$ to find the current rotation amount $\theta yaw$ of the head in the yaw direction ($=\theta yaw2-\theta yaw1$). This is the change amount of the facial orientation in the yaw direction.

At step S511c, if the head of the driver D moved in the Z-axis direction, i.e., the up-down direction of the vehicle K (or if a head up-down movement amount is detected), the movement amount is used as a movement amount in the Z-axis direction at step S517 described later.

Using the current position of the face in the Z-axis direction (the height h2 from the ground to the eye point Ep) that is acquired from the facial orientation information detected in the facial orientation detection process (S109), the height h3 of the virtual image of the HUD 18 from the ground, and the horizontal distance M from the eye point Ep of the driver D to the virtual image of the HUD 18, the current rotation amount $\theta pit2$ of the display window DW is calculated as $\theta pit2 = \arctan((h2-h3)/M)$. The previous calculation result, i.e., the previous rotation amount $\theta pit1$, is subtracted from the current rotation amount $\theta pit2$ to find the current rotation amount $\theta pit$ of the head in the pitch direction ($=\theta pit2-\theta pit1$). This is the change amount of the facial orientation in the pitch direction.

Next, at step S513, the current rotation amounts (yaw rotation amount, roll rotation amount, and pitch rotation amount) of the display window DW calculated at step S511 (S511a, S511b, and S511c) are stored as current rotation amounts ($\theta yaw1$, $\theta roll$, and $\theta pit1$), to be read out in the previous rotation amount acquisition process (S509) when the display position determination process is next performed.

Next, at step S515, a final rotation amount calculation process is performed. In this process, based on the facial orientation information from the facial orientation recognition ECU 30 (S109), the orientation information from the vehicle orientation detection ECU 40 (S111), and the position information from the position relationship detection unit 10d (S113), the addition operation of the display position of the display window DW converted into a 3D image is performed for each of the three types of parameters (yaw rotation amount, roll rotation amount, and pitch rotation amount), and the current rotation amount $\theta yaw$ of the head in the yaw direction ($=\theta yaw2-\theta yaw1$) and the current rotation amount $\theta pit$ of the head in the pitch direction ($=\theta pit2-\theta pit1$) calculated at step S511 are added to these.

At step S517, a final movement amount calculation process is performed. In this process, based on the facial orientation information from the facial orientation recognition ECU 30 (S109), the orientation information from the vehicle orientation detection ECU 40 (S111), and the position information from the position relationship detection unit 10d (S113), the addition operation of the display position of the display window DW converted into a 3D image is performed for each of the three types of parameters (front-rear movement amount, left-right movement amount, and up-down movement amount), and the current movement amounts of the head in each of the X-axis direction, the Y-axis direction, and the Z-axis direction calculated at step S511 are added to these. When this process is complete, the routine proceeds to step S117 to perform the display image generation process shown in FIG. 3.

According to another example of the information processing of the display position determination process described with reference to FIG. 9, if the object J to be displayed in a superimposed manner on the outside landscape as a virtual image is output to the HUD 18 (S505: Yes), the current position of the face in the Y-axis direction (the distance y2 from the front of the HUD 18) and the distance M from the eye point Ep of the driver D to the virtual image of the HUD 18 are used to calculate the current rotation amount θyaw2 of the display window DW, i.e., θyaw2=arc tan(y2/M). The previous rotation amount θyaw1 is subtracted from the current rotation amount θyaw2 to find the current rotation amount θyaw of the head in the yaw direction, which is set as the change amount of the facial orientation in the yaw direction. In addition, the current position of the face in the Z-axis direction (the height h2 from the ground to the eye point Ep), the height h3 of the virtual image of the HUD 18 from the ground, and the distance M from the eye point Ep of the driver D to the virtual image of the HUD 18 are used to calculate the current rotation amount θpit2 of the display window DW, i.e., θpit2=arc tan((h2−h3)/M). The previous rotation amount θpit1 is subtracted from the current rotation amount θpit2 to find the current rotation amount θpit (=θpit2−θpit1), which is set as the change amount of the facial orientation in the pitch direction. The change amount of the facial orientation in the yaw direction and the change amount of the facial orientation in the pitch direction are then added to the rotation amounts (yaw rotation amount, roll rotation amount, and pitch rotation amount) of the facial orientation at step S515.

Accordingly, the facial orientation information can be acquired based on changes in the position of eye point due to the movement of the head of the driver D in the Y-axis direction and the Z-axis direction. Therefore, for example, addition processing for the pitch rotation amount can be further performed on the display window DW moved up or down in the Z-axis direction such that the display window DW rotates so as to appear pulled toward the rear of the vehicle K (forward) when driver D looks up at the object J, and the display window DW rotates so as to appear pushed toward the front of the vehicle K (outward) when the driver D looks down at the object J. Accordingly, even if the position of the eye point of the driver D changes, the form of the object J is corrected by rotation in the pitch direction in addition to movement in the Z-axis direction. Therefore, the object J appears to the driver D to be superimposed at a naturally correct position. Acquiring the facial orientation information based on changes in the position of eye point of the driver D enables further improvement to the positioning accuracy of the superimposed display.

As another example of the display image generation process at step S117 shown in FIG. 3, when the configuration shown in FIG. 4B is employed, the object J is rotated instead of the display window DW. Therefore, by replacing the "display window DW" with the "object J" and replacing the "addition processing" with "subtraction processing" in the method of determining the display position described with reference to FIGS. 6 to 8 and the display position determination process described with reference to FIG. 9, the method of determining the display position (FIGS. 6 to 8) and the display position determination process (FIG. 9) when employing the configuration shown in FIG. 4B can be described.

Specifically, in the final rotation amount calculation process (S515), of the display position determination process shown in FIG. 9, based on the facial orientation information from the facial orientation recognition ECU 30 (S109), the orientation information from the vehicle orientation detection ECU 40 (S111), and the position information from the position relationship detection unit 10d (S113), the subtraction operation of the display position of the object J converted into a 3D image is performed for each of the three types of parameters (yaw rotation amount, roll rotation amount, and pitch rotation amount). Then, the current rotation amount θyaw of the head in the yaw direction (=θyaw2−θyaw1) and the current rotation amount θpit of the head in the pitch direction (=θpit2−θpit1) calculated at step S511 are subtracted therefrom.

Also, in the final movement amount calculation process (S517), based on the facial orientation information from the facial orientation recognition ECU 30 (S109), the orientation information from the vehicle orientation detection ECU 40 (S111), and the position information from the position relationship detection unit 10d (S113), the subtraction operation of the display position of the object J converted into a 3D image is performed for each of the three types of parameters (front-rear movement amount, left-right movement amount, and up-down movement amount), and the current movement amounts in each of the X-axis direction, the Y-axis direction, and the Z-axis direction calculated at step S511 are subtracted therefrom.

If the subtraction operation is performed for the up-down movement amount and the left-right movement amount, the movement amounts must be multiplied together (horizontal distance M/separation distance L) to convert them into a converted movement amount for moving the object J up, down, left, or right. Note that the horizontal distance M is the horizontal distance from the eye point Ep (Ep' or Ep") of the driver D to the virtual image of the HUD 18 (see FIG. 8), and the separation distance L is the separation distance between the position Q of the vehicle K and the actual position P at which the object J should exist in the landscape (see FIG. 2).

Accordingly, as another example of the display image generation process at step S117 in FIG. 3, when the configuration shown in FIG. 4B is employed, the facial orientation information can be acquired based on changes in the position of eye point due to the movement of the head of the driver D in the Y-axis direction and the Z-axis direction. Therefore, for example, the subtraction processing for the pitch rotation amount can be further performed on the object J moved up or down in the Z-axis direction such that the object J rotates so as to appear pulled toward the rear of the vehicle K (forward) when the driver D looks up at the object J, and the object J rotates so as to appear pushed toward the front of the vehicle K (outward) when the driver D looks down at the object J. Accordingly, even if the position of the eye point of the driver D changes, the form of the object J is corrected by rotation in the pitch direction in addition to movement in the Z-axis direction. Therefore, the object J appears to the driver D to be superimposed at a naturally correct position. Acquiring the facial orientation information based on changes in the position of eye point of the driver D enables further improvement to the positioning accuracy of the superimposed display.

The following expresses the technical ideas included in the other examples of information processing described above in the display position determination process.

[1]

An information display apparatus is characterized by including: display means capable of displaying in a superimposed manner an informational image that represents prescribed information on a landscape outside a vehicle as seen by a driver; position information acquisition means for acquiring, as position information, a relationship between a position of the vehicle and an actual position at which the informational image to be displayed in a superimposed manner should exist in the landscape; orientation information acquisition means for acquiring orientation information of the vehicle; facial orientation information acquisition means for acquiring facial orientation information of the driver; display position determination means for determining a display position of the informational image displayed by the display means based on the position information, the orientation information, and the facial orientation information; and display control means for controlling the display means to display the informational image at the display position determined by the display position determination means, wherein the display position determination means determines the display position of the informational image based on head position information regarding the driver according to the facial orientation information, behavior information regarding the vehicle according to the orientation information, and the position information regarding the position relationship between the vehicle and the informational image.

Thus, the display position of the informational image displayed by the display means is determined based on the head position information regarding the driver according to the facial orientation information, the behavior information regarding the vehicle according to the orientation information, and the position information regarding the position relationship between the vehicle and the informational image. Therefore, even when the landscape outside the vehicle as seen by the driver changes due to, for example, bouncing or up and down movements of the vehicle, a superimposed display that follows such changes in the landscape is possible. Hence, the positioning accuracy of the superimposed display can be improved.

[2]

The information display apparatus of the technical idea described in [1] is further characterized in that if the display means is a head-mount display configured so as to be mounted on the head of the driver of the vehicle, the display position determination means determines the display position of the informational image based on the following: a yaw rotation amount, a roll rotation amount, a pitch rotation amount, a front-rear movement amount, a left-right movement amount, and an up-down movement amount included in the head position information of the driver; a yaw rotation amount, a roll rotation amount, a pitch rotation amount, a front-rear movement amount, a left-right movement amount, and an up-down movement amount included in the behavior information of the vehicle; and distance information of the position information between the vehicle and the informational image.

Thus, if the display means is a head-mount display, the display position of the informational image is determined based on the head position information that includes the yaw rotation amount, the roll rotation amount, the pitch rotation amount, the front-rear movement amount, the left-right movement amount, and the up-down movement amount; the behavior information of the vehicle that includes the yaw rotation amount, the roll rotation amount, the pitch rotation amount, the front-rear movement amount, the left-right movement amount, and the up-down movement amount; and the distance information between the vehicle and the informational image. Therefore, even when the landscape outside the vehicle as seen by the driver changes due to, for example, bouncing or up and down motions of the vehicle, a superimposed display that the such changes in the landscape is possible. Hence, the positioning accuracy of the superimposed display can be improved.

[3]

The information display apparatus of the technical idea described in [1] is further characterized in that if the display means is a head-up display configured so as to be capable of projecting an image on a windshield of the vehicle, the display position determination means determines the display position of the informational image based on the following: a yaw rotation amount, a roll rotation amount, a pitch rotation amount, a front-rear movement amount, a left-right movement amount, and an up-down movement amount included in the head position information of the driver; a yaw rotation amount, a roll rotation amount, a pitch rotation amount, a front-rear movement amount, a left-right movement amount, and an up-down movement amount included in the behavior information of the vehicle; distance information of the position information between the vehicle and the informational image; and a yaw rotation amount of the head based on the left-right movement amount of the head, and a pitch rotation amount of the head based on the up-down movement amount of the head.

Thus, if the display means is a head-up display, the display position of the informational image is determined based on the head position information that includes the yaw rotation amount, the roll rotation amount, the pitch rotation amount, the front-rear movement amount, the left-right movement amount, and the up-down movement amount; the behavior information of the vehicle that includes the yaw rotation amount, the roll rotation amount, the pitch rotation amount, the front-rear movement amount, the left-right movement amount, and the up-down movement amount; the distance information between the vehicle and the informational image; and the yaw rotation amount of the head based on the left-right movement amount of the head, and the pitch rotation amount of the head based on the up-down movement amount of the head. Accordingly, when the position of the eye point of the driver changes in the up-down direction, the informational image is corrected based on the pitch rotation amount in addition to the up-down movement amount. Additionally, when the position of the eye point of the driver changes in the left-right direction, the informational image is corrected based on the yaw rotation amount in addition to the left-right movement amount. Therefore, the informational image appears to the driver to be superimposed at a naturally correct position. Hence, the positioning accuracy of the superimposed display can be further improved.

DESCRIPTION OF THE REFERENCE NUMERALS

10 . . . Navigation ECU
10a . . . Navigation unit
10b . . . Vehicle position detection unit
10c . . . Display information acquisition unit
10d . . . Position relationship detection unit (position information acquisition means)
10e . . . 3D image conversion unit
10f . . . Display position determination unit (display position determination means)
10g . . . Display image generation unit (display control means)
17 . . . HMD (display means)
18 . . . HUD (display means)
20 . . . Map database 30 ... Facial orientation recognition ECU (facial orientation information acquisition means)
40 ... Vehicle orientation detection ECU (orientation information acquisition means)
50 ... Monitor ECU (display means)
D ... Driver
DW ... Display window
Ep ... Eye point
J ... Object (informational image)
K ... Vehicle
P ... Actual position at which object should exist in landscape
Q ... Vehicle position
VA ... Virtual area

The invention claimed is:

1. An information display apparatus comprising:
    display means capable of displaying in a superimposed manner an informational image that represents prescribed information on a landscape outside a vehicle as seen by a driver;
    position information acquisition means for acquiring, as position information comprising position information parameters, a relationship between a position of the vehicle and an actual position at which the informational image to be displayed in a superimposed manner should exist in the landscape;
    orientation information acquisition means for acquiring orientation information of the vehicle, wherein the orientation information comprises vehicle orientation information parameters, and wherein an orientation of the vehicle is defined as a roll center of the vehicle relative to a location of the vehicle;
    facial orientation information acquisition means for acquiring facial orientation information of the driver taken when the driver is facing in a forward direction of the vehicle, wherein the facial orientation information comprises facial orientation information parameters;
    display position determination means for determining a display position of the informational image displayed by the display means based on the position information, the orientation information, and the facial orientation information by calculating the display position based at least partially on the vehicle orientation information parameters, the facial orientation information parameters, and the position information parameters; and
    display control means for controlling the display means to display the informational image at the display position determined by the display position determination means.

2. The information display apparatus according to claim 1, wherein
    the position information acquisition means acquires the position information based on one of information included in map information pertaining to roads, traffic signals, signs, buildings, rivers, and others forming the landscape; and route guidance information for the vehicle pertaining to a route guidance point, a destination point, and others.

3. The information display apparatus according to claim 2, wherein
    the display control means includes:
    informational image positioning means for positioning the informational image in a virtual area, and
    display object selection means for displaying on the display means the informational image that exists within a display window covering a smaller area than the virtual area and settable at any position within the virtual area, and
    the display control means determines the position of the display window based on the display position determined by the display position determination means.

4. The information display apparatus according to claim 1, wherein
    the display control means includes:
    informational image positioning means for positioning the informational image in a virtual area, and
    display object selection means for displaying on the display means the informational image that exists within a display window covering a smaller area than the virtual area and settable at any position within the virtual area, and
    the display control means determines the position of the display window based on the display position determined by the display position determination means.

* * * * *